Feb. 22, 1966 E. R. ANDREGG 3,237,058

IMPEDANCE MEASURING CIRCUIT

Filed Aug. 25, 1960

INVENTOR
E. R. ANDREGG

BY R. O. Nimtz

ATTORNEY

3,237,058
IMPEDANCE MEASURING CIRCUIT

Ernest R. Andregg, Indianapolis, Ind., assignor to Bell Telephone Laboratories, Incorporated, New York, N.Y., a corporation of New York Filed Aug. 25, 1960, Ser. No. 51,891
9 Claims. (Cl. 317—148.5)

This invention relates to impedance detecting circuits and, more particularly, to circuit means responsive to impedance values falling within a narrow range of values.

It is often desirable to know whether a particular impedance falls within or outside of a preselected range of impedances. A circuit for detecting this condition can, for example, be used to grade impedance elements or, more particularly, to determine whether a particular item has or has not a preselected impedance value. Such a circuit, for example, is useful in determining the validity of credit cards which provide access to automatic service equipment such as telephones. Such a system is shown in the copending application of W. Pferd, Serial Number 781,251, filed December 18, 1958. In order to be effective for this purpose, however, the impedance checking circuit must be relatively sensitive so as to respond only to those credit cards having the requisite characteristics.

It is an object of the present invention to reduce the size, cost and complexity of impedance responsive circuits while at the same time improving their sensitivity.

It is another object of the invention to enable apparatus providing automatic service by means of a credit card having a controlled resitivity when and only when that resistivity falls within a narrow range of values.

In accordance with the present invention, a voltage divider including the impedance element to be measured is connected across a source of reference potential. Intermediate points on this voltage divider are connected to the base electrodes of a plurality of transistors at least two of which are of opposite conductivity types. An output current responsive device is connected in a series circuit with the collector-emitter paths of all of the transistors.

It can be seen that the current responsive device will be energized only when all of the transistors are in a conducting condition. When any of these transistors are cut off, little or no current will be supplied to the current responsive device. Moreover, if the current responsive device is chosen so as to be operative only upon receipt of a selected threshold level of current, this device will respond only if the biases at the bases of the transistors permit adequate conduction through all transistors.

From the above description it can be seen that a single voltage divider, when properly arranged, will provide the requisite voltages at the bases of all of the transistors for only a limited range of card impedances. Furthermore, the range of impedances which causes the circuit to operate may be broadened, narrowed or shifted in value by the simple expedient of adjusting the values of the components in the voltage divider.

These and other objects and features, the nature of the present invention and its various advantages may be more readily understood upon consideration of the attached drawing and of the following detailed description of the drawing.

Figure 1:
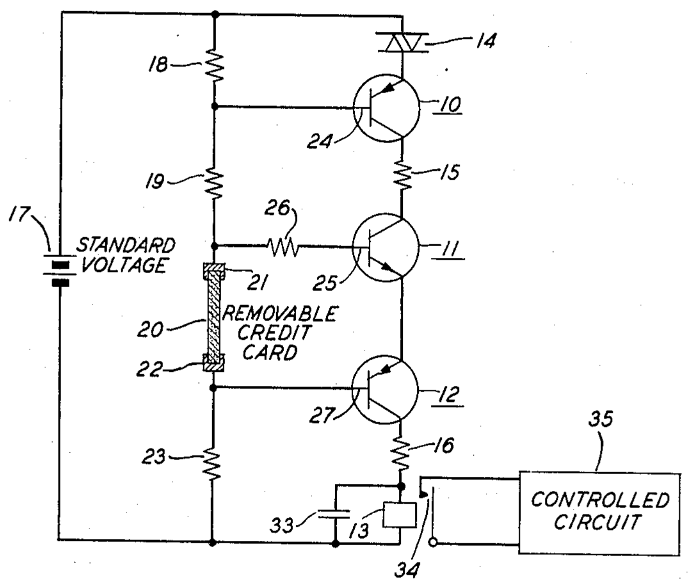
FIG. 1 is a schematic diagram of an impedance detecting circuit in accordance with the present invention.

Referring more particularly to FIG. 1, the impedance detection circuit comprises three transistors 10, 11 and 12 connected in a series circuit with the winding of a relay 13 such that all three transistors must be conducting before any substantial current will flow through the relay winding. Connected in this same series circuit is a semiconductor breakdown diode 14, and two resistance elements 15 and 16. This series circuit is connected across a standard voltage source 17 across which there is also connected a voltage divider comprising resistor 18, resistor 19, credit card 20, arranged to be inserted in holders 21 and 22 to complete an electrical circuit therethrough, and a resistor 23.

Figure 1A:
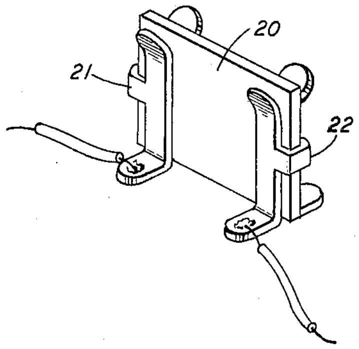
FIG. 1A is a perspective view of one type of credit card holder which can be used in the circuit of FIG. 1.

Holders 21 and 22 provide low resistance contacts to the card material and may, for example, contact a conductive film deposited on a portion of the card 20. The details of one such card holder are shown in FIG. 1A where the card holders 21 and 22 comprise biased spring elements adapted to guide card 20 into position and exert pressure against opposite faces of card 20 to obtain low resistance contacts. Many other forms of card holders would serve equally well in the circuit of FIG. 1.

The base 24 of transistor 10 is connected to the midpoint between resistors 18 and 19. The base 25 of transistor 11 is connected through resistor 26 to the midpoint between resistor 19 and holder 21. The base 27 of transistor 12 is connected to the mid-point between holder 22 and resistor 23. The operation of the checking circuit of FIG. 1 may be more easily understood by referring to the curve of FIG. 2.

Figure 2:
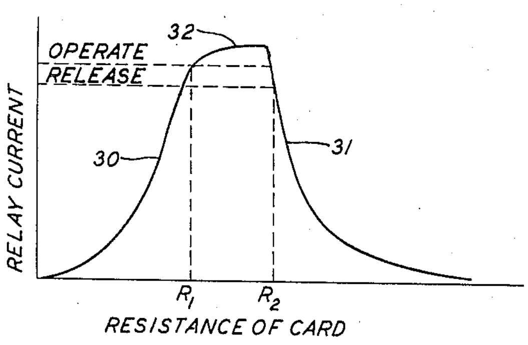
FIG. 2 is a graphical illustration of the impedance versus current characteristic of the circuit of FIG. 1.

In FIG. 2 there is shown a graphical representation of the current flowing through the winding of relay 13 versus the resistance of the credit card 20. This curve may be considered as consisting of two separate and distinct parts, 30 and 31, joined at the peak current level 32. The first portion 30 of the curve of FIG. 2, ranging over resistance values from zero to $R_1$, is controlled by transistors 11 and 12 with transistor 10 in a current saturated state. The second portion 31 of the curve of FIG. 2, ranging over resistance values from $R_2$ to infinity, is controlled by the transistor 10 with transistors 11 and 12 in a current saturated state. The two parts combined characterize a composite circuit capable of operating a current sensitive discriminating relay 13 over a narrow range of resistance values for card 20.

Referring again to FIG. 1, the bias current path for transistors 11 and 12 is obtained through resistor 18 in parallel with transistor 10 and diode 14, resistors 19 and 26, the base-emitter junctions of transistors 11 and 12, and resistor 23. The resistance of credit card 20 serves essentially to shunt bias current away from the base emitter paths of transistors 11 and 12. When this resistance is very small, most of the current is shunted through the card. The current available to forward bias the base-emitter junctions of transistors 11 and 12 therefore becomes insufficient and the two transistors turn off. The maximum current which can be delivered to relay winding 13 when transistors 11 and 12 are thus biased off is the leakage current $I_{c0}$ of either transistor. When transistors 11 and 12 are thus cut off, transistor 10 has the maximum bias current available flowing through its base emitter junction in such a direction as to forward bias this junction and saturate the transistor. This is due to the large voltage drop across resistor 18.

As the resistance of card 20 increases, the shunting effect around the base-emitter junctions of transistors 11 and 12 is reduced and these transistors gradually allow greater and greater currents to flow through the winding 13. At some threshold current level, winding 13 closes contacts 34 and energizes a controlled circuit 35, such as an automatic credit apparatus.

Considering now the second portion 31 of the curve of FIG. 2, it can be seen that transistor 10, being in a saturated condition, cannot support any additional current flow. As larger currents are drawn through transistors 11 and 12, the additional current flows through resistor 18. The value of resistor 18 is chosen to provide a voltage drop, thereacross exceeding the base-emitter cut-off potential of transistor 10 and the breakdown voltage of diode 14 for the range represented by portion 30 of the curve of FIG. 2.

As the resistance of card 20 further increases, the current through transistors 11 and 12 also increases until they become saturated. Any further increase in resistance of card 20 only serves to reduce the current drawn by the voltage divider. The current through resistor 18 therefore decreases, reducing the voltage drop across the base-emitter junction of transistor 10 and breakdown diode 14. Eventually this voltage becomes low enough for transistor 10 to turn off. At this point, the current supplied to winding 13 rapidly drops off, since only the base currents of transistors 11 and 12 are available to energize this winding. Capacitor 33, connected across winding 13, insures that the relay will not chatter when it operates or releases. Capacitor 33 also protects the transistors from inductive surge voltages which may be induced by winding 13 when card 20 is removed from the circuit.

It can be seen from FIG. 2 that the maximum sensitivity of the detecting circuit is obtained when the operate and release currents of the relay 13 are as close to the saturation currents of transistors 11 and 12 as possible, leaving, of course, a small margin for variations in component values and environmental conditions.

In the aforementioned copending application of W. Pferd, there is disclosed the details of a pay telephone operated by credit cards wherein the present invention might find use. In this application, the validity of the credit card is checked by the simple expedient of inserting a portion of the card material in an impedance bridge circuit and enabling the pay station only when this resistance value falls within a preselected range. The circuit of the present invention performs the same function for checking the validity of credit cards as the Pferd circuit, but with a much higher sensitivity to changes of resistance values and hence much greater protection against fraudulent cards.

It is to be understood that the above described arrangements are merely illustrative of numerous and varied other arrangements which may constitute applications of the principles of the invention. Such other arrangements may readily be devised by those skilled in the art without departing from the spirit and scope of the invention.

What is claimed is:

1. A detecting circuit comprising a source of reference voltage, a voltage divider connected across said source of reference voltage and including a plurality of impedance elements, one of said impedance elements comprising a credit card formed of material of controlled resistivity, a plurality of transistors at least some of which are of opposite conductivity types, means connecting the bases of said transistors at various different points in said voltage divider, a current responsive device, and means connecting said current responsive device and the collector-emitter paths of said transistors in a series circuit across said source of reference potential.

2. An impedance detecting circuit comprising a plurality of transistors, at least two of said transistors being of opposite conductivity types, a current responsive device, means connecting the collector-emitter paths of said transistors in a series circuit with said current responsive device, a source of operating voltage, means connecting said series circuit across said source of operating voltage, a voltage divider, a card of controlled resistivity, means for receiving at least some portion of said card in said voltage divider, and means for deriving the base voltages for said transistors from said voltage divider.

3. The impedance detecting circuit according to claim 2 wherein said current responsive device comprises the winding of a relay, and contact means operated by said relay winding to complete an electrical circuit.

4. The impedance detecting circuit according to claim 2 wherein said series circuit includes a voltage breakdown device, and means connecting the base electrodes of said two transistors at opposite ends of said card.

5. In combination, a source of reference potential, first and second series circuits connected across said source of reference potential, said first series circuit including a current responsive device, the collector-emitter paths of a plurality of transistors and a voltage breakdown device, said second series circuit including a plurality of impedance elements and means adapted to receive a removable element of controlled resistance, and means for connecting the base electrodes of said transistors to intermediate points on said second series circuit so as to energize all of said transistors only when the resistance of said removable element falls within a preselected range of impedances.

6. The combination according to claim 5 wherein said first series circuit includes the collector-emitter paths of three transistors one of which is of a different conductivity type than the other two, and means for connecting the base electrodes of two of said transistors of opposite conductivity types to opposite sides of said receiving means.

7. A credit card validity checking circuit comprising a source of reference potential, a voltage divider including a plurality of resistive elements and means adapted to receive at least a portion of said credit card in said voltage divider, said divider being connected across said source of reference potential, a first and second transistor of opposite conductivity types, means connecting the base electrodes of said first and second transistors to said voltage divider at opposite ends of said credit card receiving means, a third transistor, means connecting the base electrode of said third transistor to said voltage divider between two of said resistive elements, a current-sensitive relay winding, means connecting said winding and the collector-emitter paths of all of said transistors in a series circuit across said source of reference potential, and means responsive to said relay winding for indicating the validity of said credit card.

8. In combination, input lines including a first and second input line adapted to be connected to a source of potential, a first circuit connected directly across said input lines, a second circuit connected directly across said input lines; said first circuit and said second circuit comprising a current responsive device, a plurality of transistors and a plurality of impedance elements; said first circuit including said current responsive device connected in series with the collector-emitter paths of said plurality of transistors, said second circuit comprising a voltage divider wherein the impedance elements of said plurality of impedance elements are series connected to form the voltage divider, said voltage divider including at least one impedance element of said plurality of impedance elements connected intermediate the remaining impedance elements of said plurality of impedance elements; and means connecting the base electrodes of the transistors at various different points in said voltage divider so as to operatively energize said current responsive device only when the impedance of said one impedance element falls within a preselected range of impedance values.

9. A control circuit comprising an electric power source, a circuit connected thereto containing in series two resistances and a controlled impedance element therebetween, a pair of transistors each of which has at least three terminal elements, one of said transistors having two of its elements shunt-connected across a circuit including the first resistance, and the other of said transistors having two of its elements shunt-connected across a circuit including the second resistance, and output means connected in said circuit for responding to the conduction of said transistors.

References Cited by the Examiner

UNITED STATES PATENTS

| | | | |
|---|---|---|---|
| 2,831,126 | 4/1958 | Linville et al. | 307—88.5 |
| 2,864,007 | 12/1958 | Clapper | 307—88.5 |
| 2,930,942 | 3/1960 | Levine et al. | 317—148.5 |
| 2,939,018 | 5/1960 | Faulkner | 307—88.5 XR |
| 2,946,951 | 7/1960 | Boode | 324—62 |
| 2,971,134 | 2/1961 | Cockrell | 317—148.5 XR |

FOREIGN PATENTS

| | | |
|---|---|---|
| 821,766 | 10/1959 | Great Britain. |

SAMUEL BERNSTEIN, *Primary Examiner.*

MAX L. LEVY, *Examiner.*